United States Patent [19]

Osborne et al.

[11] Patent Number: 4,895,895
[45] Date of Patent: Jan. 23, 1990

[54] THICKENED MOULDING COMPOSITIONS

[75] Inventors: Trevor R. Osborne; Stephen J. Thompson, both or Wellingborough, England

[73] Assignee: Scott Bader Company Limited, Wellingborough, England

[21] Appl. No.: 63,211

[22] Filed: Jun. 17, 1987

[30] Foreign Application Priority Data

Dec. 15, 1986 [GB] United Kingdom ................. 8629895

[51] Int. Cl.$^4$ ...................... C08L 67/06; C08L 63/10; C08L 75/04
[52] U.S. Cl. ........................................ 525/28; 525/31; 525/41; 525/109; 525/126; 525/168; 525/170; 523/523; 523/526; 523/527
[58] Field of Search ................. 525/41, 170, 168, 126, 525/31, 109; 523/527

[56] References Cited

U.S. PATENT DOCUMENTS 2,857,359 10/1958 Scholick et al. .
3,932,980 1/1976 Mizutani et al. ...................... 53/111

FOREIGN PATENT DOCUMENTS 083837   7/1983  European Pat. Off. .
041814   6/1962  Luxembourg .
1007168 10/1965  United Kingdom .
1318517  5/1973  United Kingdom .
1319243  6/1973  United Kingdom .

OTHER PUBLICATIONS

Yamada et al., "TMC ™ —Combining SMC—BMC Compounding with New Impregnating Efficiency & Economy," 33rd Annual Technical Conference, 1978, Reinforced Plastics/Composites Institute, The Society of the Plastics Industry, Inc., Section 4-B, pp. 1–6.
European Search Report, Application No. 87 30 5064.

Primary Examiner—Patricia Short
Attorney, Agent, or Firm—Cushman, Darby & Cushman

[57] ABSTRACT

A thickened moulding composition comprises fibrous reinforcement, an ethylenically unsaturated polymer, a monomer copolymerizable therewith and a crystalline unsaturated polyester having a glycol component derived from at least two symmetrical glycols.

Preferably, the crysatlline polyester has a molecular weight per double bond of no more than about 210 and a melting point of from 50°–115° C.

10 Claims, 1 Drawing Sheet

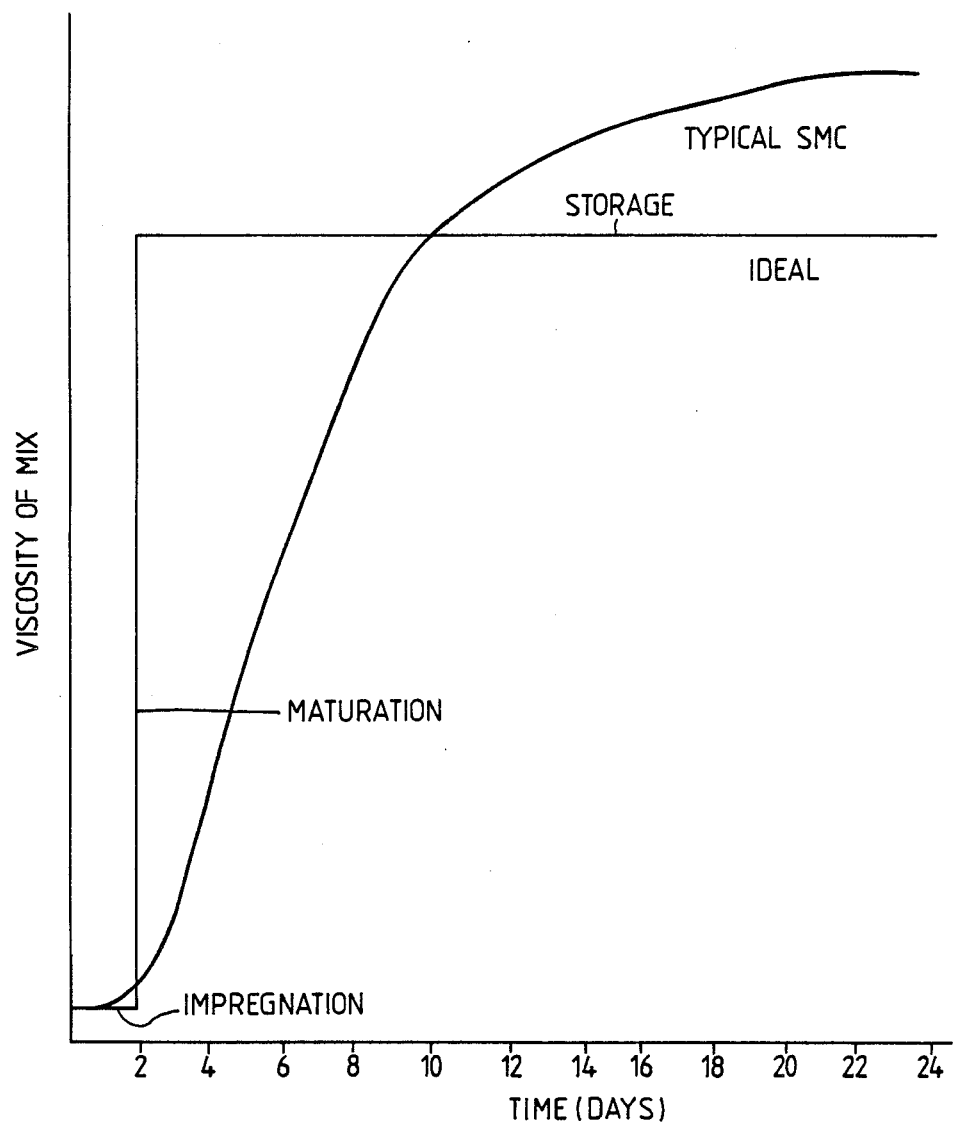

THICKENED MOULDING COMPOSITIONS

FIELD OF THE INVENTION

This invention relates to thickened reinforced unsaturated resin compositions suitable for moulding.

BACKGROUND OF THE INVENTION

Moulding compositions based on unsaturated polyester resins normally consist of resin, filler, catalyst for curing, internal mould release agents and reinforcing fibers. The original compositions were in the form of a putty-known as dough moulding compounds (DMC). Following the discovery that the incorporation of certain Group II metal oxides and hydroxides such as CaO, $Ca(OH)_2$, $Mg(OH)_2$ caused thickening of the resin system, compositions which were tack free known as bulk moulding compounds (BMC), sheet moulding compounds (SMC) and thick moulding compounds (TMC) became available. BMC was originally based on chopped glass fibers whilst SMC and TMC were based on chopped strand mat and roving cuttings respectively. In SMC the resin was applied to the chopped strand mat and, after compacting, was rolled up between cover sheets of, for example, polyethylene. After about 3 days the polyethylene could be readily peeled off to yield a tack free sheet, weighing typically from 3–8, preferably from 4–8, more preferably from 5–6 $Kg/m^2$, which could be loaded into a heated press and moulded at temperatures of 120°–150° C. under pressure. In TMC, which allows for three dimensional orientation of the fibers, the roving cuttings were ordered in parallel strands and fed together with resin paste material, for example, by a pump, into the nip of two contrarotating rollers. The compound was then passed through fast running take-off rollers onto a carrier film of, for example, nylon which, together with a cover film, was fed on to a conveyor belt. This resulted in a sheet weighing, typically, from 5–40, for example, from 6–20, or from 20–40 $Kg/m^2$, which was cut, for example, by hand and laid often as a single piece, in a mould. A typical machine for producing TMC is disclosed in US-A-No. 3932980, and a comparison of SMC and TMC is made by M. Yamada et al, 33rd Annual Technical Conference, 1978 Reinforced Plastics/Composites Institute, The Society of the Plastics Industry, Inc., Section 4-8 pages 1–6.

The thickening of resin by Group II metal oxides/hydroxides is due to a combination of the formation of covalent bonds and co-ordinate bonds. It is difficult to control. Ideally the impregnation mix should be low in viscosity to allow good impregnation of the fibers, should thicken rapidly after impregnation and should reach a maximum viscosity which does not change on storage. Such behaviour is represented by a graph of viscosity vs. time (days) marked "IDEAL" in the accompanying drawing. What actually happens when using such metal oxides/hydroxides is also shown in another graph of the accompanying drawing marked "TYPICAL SMC". The rate and extent of thickening depends on the resin used to such an extent that not only the normal resin parameters have to be controlled (i.e. acid value and viscosity) but also hydroxyl value and molecular weight distribution. In addition, since the metal oxide/hydroxide is influenced by the presence of moisture and carbon dioxide in the atmosphere, special storage precautions are required to prevent even further variations in maturation on storage.

It is also known to make other types of thermosetting resins, e.g. vinyl esters, into BMCs and SMCs, but it has previously been necessary to make special modifications to the resins to allow the thickening reaction with Group II oxides and hydroxides to occur, this being because the standard vinyl ester resins often have very low acid values.

All of the above-mentioned compositions were highly filled, but if unfilled systems were required the filler was omitted and a solvent based resin was pre-impregnated on to reinforcing fibres, the solvent removed and the resulting tacky prepreg rolled up between sheets of film. However, the sheets of film were difficult to remove from these prepegs due to the tackiness of the pre-impregnated fibre.

One method of overcoming the disadvantages with unfilled pre-impregnated reinforcements is described in GB-A-1319243 and GB-A-1318517. Examples are given in these patents of polyester resins which when blended with styrene monomer are solid and can be used to impregnate reinforcing fibres when molten.

In our EP-A-0083837, we disclosed the use of crystalline resins to thicken both filled and unfilled ethylenically unsaturated polymer moulding compositions based on standard resins thus eliminating the need for special resins made for moulding compositions. Because the thickening mechanism is a physical one a number of other advantages occur:

(i) no metal oxide/hydroxide is required and hence, in contrast to when a metal oxide is used, no special storage precautions are required to prevent further variations in maturing, (ii) indeed, no maturation period is required, the compositions being ready for moulding as soon as they have cooled and (iii) storage stability is much improved.

Whilst such compositions have proved useful in industry they have shown the disadvantages of reducing the effectiveness of low profile and/or low shrink additives when they are incorporated in the moulding compositions. In particular, they at least to some extent reduce gloss, allow the fibre glass pattern to become more visible, increase surface waviness and allow shrinkage to occur.

SUMMARY OF THE INVENTION

We find that such compositions are improved if the crystalline polyesters used as thickeners are those made by the reaction of two or more symmetrical glycols such as 1,6-hexanediol, ethylene glycol, neopentyl glycol, or 1,4-cyclohexane dimethanol, with an unsaturated dicarboxylic acid, preferably fumaric acid.

Preferred crystalline polyesters have at least one of the following characteristics namely, (a) a molecular weight per double bond of no more than 210 and (b) a melting point within the range 50°–115° C., more preferably 80°–115° C.

The polyesters are capable of crystallising by virtue of their having a symmetrical structure.

For ease of moulding they should have a melt viscosity of from about 1 to about 40 p (about 0.1 to about 4 Pa.s) inclusive at 125° C.

A composition in accordance with the invention comprises fibrous reinforcement, an ethylenically unsaturated polymer, a monomer copolymerisable therewith and, as thickener, a crystalline unsaturated polyester having a glycol component derived from at least two symmetrical glycols and preferably having at least one, more preferably both of the above features (a) and (b).

The crystalline polyester is preferably present in the composition in an amount of from 10-50%, more preferably 15-40%, by weight of the total weight of unsaturated polymer, copolymerisable monomer and crystalline polyester.

The unsaturated polymers to which the thickeners are added may be unsaturated polyesters such as those made by reaction of one or more glycols with an unsaturated dicarboxylic acid or its anhydride or with a mixture of the unsaturated acid or its anhydride with a saturated dicarboxylic acid or its anhydride. Optionally, minor amounts of alcohols, polyols, monobasic or polybasic acids may be incorporated in the reaction mixtures from which the unsaturated polyesters are made, which reaction mixtures may also include dicyclopentadiene to modify the polyesters.

Other unsaturated polymers which can be made into resin compositions in accordance with the invention using these techniques are vinyl ester polymers (which may be prepared by reaction of acrylic or methacrylic acid with epoxy resins) and urethane acrylate polymers, especially acrylate terminated polyurethanes.

The unsaturated polymers to which the thickeners are added are essentially amorphous.

The ethylenically unsaturated polymer may be dissolved in at least a portion of the monomer copolymerisable therewith prior to its incorporation in the composition so that the polymer is then incorporated in the composition as a liquid resin.

The monomer copolymerisable with the ethylenically unsaturated amorphous polymer may be any suitable vinyl monomer such as styrene, vinyl toluene, p-methyl styrene, chlorostyrene, t-butyl styrene, methyl methacrylate, a glycol diacrylate or diallyl phthalate.

The resin composition may be unfilled or alternatively may additionally contain a filler, which can be selected from, for example, natural or precipitated calcium carbonates, clays, silica, talc, mica and alumina hydrate, which filler may be present in large amounts, especially in a TMC.

The composition is reinforced either by admixing a reinforcement, preferably reinforcing fibers, with the other components of the composition or by impregnating it into a fabric made from reinforcement fibers, so providing a prepeg. Whilst the reinforcing fibers will normally be glass fibres they may be substituted wholly or in part by carbon fibres, KEVLAR ® or similar aramid fibres, natural fibres e.g. jute, or synthetic fibres.

Particularly preferred compositions are sheet moulding compounds (SMC) and thick moulding compounds (TMC).

Pigments may be incorporated in the compositions if required.

The compositions may be cured using free radical catalysts such as organic peroxy compounds, e.g. t-butyl perbenzoate or perketals but unfilled compositions may be cured using light as described in our EP-B-0025359.

Typical mould release agents which may additionally be incorporated in these compositions are zinc stearate and ZELEC ® UN, an unneutralized alcohol ester of orthophosphoric acid, commercially available from Du Pont Company (United Kingdom) Limited.

Any of the thermoplastics normally incorporated into SMC, TMC or BMC as low profile and/or low shrink additives to improve surface characteristics and/or reduce shrinkage may be incorporated in the compositions, e.g. polyethylene, acrylic co-polymers, polystyrene (optionally modified by the presence of units capable of providing elastomeric properties, such as butadiene units), saturated polyesters, polycaprolactones, and polyvinyl acetate.

BRIEF DESCRIPTION OF THE DRAWING

Ideal viscosity behavior for an impregnation mix is represented by a graft of viscosity vs. time (days) marked "IDEAL" in the accompanying drawing. What actually happens when using metal oxides/hydroxides is also shown in another graph of the accompanying drawing marked "TYPICAL SMC".

DESCRIPTION OF PREFERRED EMBODIMENTS

Embodiments of the invention will now be described in more detail with reference to the following Examples.

EXAMPLES X AND Y (Amorphous polyesters present in a thickened composition embodying the invention).

Standard amorphous polyesters X and Y (sometimes referred to hereinafter as "amorphous resins") were made and dissolved in styrene monomer.

X was based on propylene glycol with a mixture of maleic anhydride and isophthalic acid of a molar ratio of 3.7:1.

Y was based on propylene glycol and maleic anhydride reacted in equimolar proportions.

EXAMPLES A-H (Crystalline Polyesters)

Examples A and B are given by way of comparison and Examples C-H illustrate crystalline polyesters for use as thickeners in methods embodying the invention.

Eight crystalline polyesters (sometimes referred to hereinafter as "crystalline resins") were made and the formulation and properties of these are shown in Table 1.

TABLE 1

| | Crystalline Resins | | | | | | | |
|---|---|---|---|---|---|---|---|---|
| Resin | 1,6-Hexanediol (mols) | Ethylene Glycol (mols) | Fumaric Acid (mols) | 1,4-Cyclohexane Dimethanol (mols) | Terephthalic Acid (mols) | MW per Double Bond | M Pt °C.** | Melt viscosity Ps (Pa.s) at 125° C. |
| A* | 3.3 | — | 2.3 | — | 1.0 | 304 | 84 | 34 (3.4) |
| B* | 4.2 | — | 3.2 | — | 1.0 | 275 | 86 | 25 (2.5) |
| C | 3.0 | 1.0 | 4.0 | — | — | 184 | 87 | 35 (3.5) |
| D | 3.4 | — | 4.4 | 1.0 | — | 204 | 79 | 32 (3.2) |
| E | 2.0 | 1.0 | 3.0 | — | — | 179 | 74 | 4 (0.4) |
| F | 1.5 | 1.0 | 2.5 | — | — | 179 | 63 | 6.5 (0.6) |
| G | 1.0 | 1.0 | 2.0 | — | — | 170 | 56 | 7 (0.7) |

TABLE 1-continued

| | | | Crystalline Resins | | | | | |
|---|---|---|---|---|---|---|---|---|
| Resin | 1,6-Hexanediol (mols) | Ethylene Glycol (mols) | Fumaric Acid (mols) | 1,4-Cyclohexane Dimethanol (mols) | Terephthalic Acid (mols) | MW per Double Bond | M Pt °C.** | Melt viscosity Ps (Pa.s) at 125° C. |
| H | — | 1.0 | 4.0 | 3.0 | — | 204 | 114 | 32 (3.2) |

*Comparative
**M Pt: A small sample of resin was placed on a stainless steel hotplate and covered with a glass coverslip. The temperature was raised at the rate of 2° C./min and the melting point noted when the resin visually became a clear mobile liquid.

EXAMPLES 1-10

Formulations of compositions ("Compound" Formulations)

A basic resin formulation for impregnating chopped strand mat glass fiber was used as follows to provide a series of resin compositions containing various combinations of the amorphous and crystalline polyesters of cessing changes were necessary; the premix temperature was raised to 98°-104° C. and the moulding temperature to 170° C. Perkadox ®BC40 was substituted for the catalyst Trigonox ® 29B50.

The mouldings were assessed visually for overall surface quality, and the assessment expressed numerically on a scale of 0 (very poor) to 10 (excellent).

The results are contained in Table 2.

TABLE 2

| | | | Mouldings from Compounded Resin Mixtures | | |
|---|---|---|---|---|---|
| Example | Amorphous Resin | Crystalline Resin | Linear Dimensional Change* Parts/1000 | Surface Quality Assessment | Comment |
| 1 | X | A | −0.32 | 2 | Uneven, prominent glass pattern, dull |
| 2 | Y | A | −0.22 | 3 | Smooth, moderate glass pattern, fairly glossy |
| 3 | X | B | −0.02 | 4 | Smooth, prominent glass pattern, fairly glossy |
| 4 | X | C | −0.04 | 8 | Smooth, negligible glass pattern, glossy |
| 5 | Y | C | +0.13 | 10 | Excellent, smooth, no glass pattern, very glossy |
| 6 | Y | D | 0.00 | 10 | Excellent, smooth, no glass pattern, very glossy |
| 7 | X | E | +0.15 | 8 | Smooth, even, good gloss |
| 8 | X | F | +0.19 | 7 | Smooth, even, fair gloss |
| 9 | X | G | +0.22 | 8 | Smooth, even, good gloss |
| 10 | X | H | +0.26 | 9 | Smooth, even, extremely glossy |

*Linear Dimensional Change: a positive figure indicates expansion, i.e. negative shrinkage.
**For mould design conditions where zero shrinkage is desired, this represents the best method of performing the invention.

Examples X and Y and A-H respectively:

| | 1-9 | 10 |
|---|---|---|
| Amorphous resin | 55.0 pbw | 95.2 pbw |
| Styrene | 27.5 pbw | 15.0 pbw |
| Crystalline resin | 55.0 pbw | 30.0 pbw |
| Low Profile Additive | 112.5 pbw | 112.5 pbw |
| Filler (Millicarb ® - a commercial availability uncoated calcium carbonate) | 400 pbw | 400 pbw |
| Zinc stearate | 15 pbw | 15 pbw |
| Trigonox ® 29B50 (a commercially available peroxy catalyst - 1,1 di-tert butylperoxy 3,3,5-trimethyl cyclohexane) | 3.75 pbw | |
| Perkadox ® BC40 a (commercially available dicumyl peroxide catalyst) | | 3.75 pbw |

The low profile additive was CRYSTIC® 777 (a 40% by weight solution of a polyvinyl acetate in styrene, commercially available from Scott Bader Company Limited).

For Examples 1-9 the premix was heated to 57°-63° C. and used to form a sheet moulding compound by impregnating two layers of 450 g/m² chopped strand glass mat to give a glass content of 20.7%.

The cooled sheet moulding compound was moulded for 3 minutes at 145° C. under a pressure of 1200 psi (about 8.3 MPa) to give a cured plate nominally 102×267.56 mm and of 3.2 mm thickness. Linear shrinkage was determined by measuring, at 25° C., the difference between the length of the mould (267.56 mm) and the length of the moulding removed from the mould and expressed as parts per thousand.

Example 10 was a formulation containing a high melting point resin H. Consequently the following pro-

EXAMPLES 11 AND 12

Two moulding compositions were made as follows:

| | | |
|---|---|---|
| Amorphous Resin X | 27 pbw | 27 pbw |
| Crystalline Resin A (comparative) | 22 | — |
| Crystalline Resin C | — | 22 |
| Styrene | 11 | 11 |
| Low Shrink Additive* | 40 | 40 |
| Filler (Omya ® BLH - a commercially available stearate coated calcium carbonate) | 160 | 160 |
| Release Agent (zinc stearate) | 6 | 6 |
| Catalyst (Trigonox ® 29B50) | 1.5 | 1.5 |

*40% by weight solution of M9C7 (a butadiene modified polystyrene commercially available from Amoco Chemicals) in styrene monomer.

They were used to impregnate chopped strand mat glass fibre to give a sheet moulding compound with a glass content of 20.7%. They were moulded at 145° C. for 3 minutes at 1200 psi (about 8.3 MPa) as in Examples 1-9, and the cured mouldings examined as previously.

Example 11 showed a shrinkage of 1.02 parts per thousand and had a smooth, even, surface with slight rippling, slight glass pattern and moderate gloss-assessed as 3.

Example 12 showed a shrinkage of 0.74 parts per thousand with a smooth even surface with no rippling or glass pattern and very good gloss—assessed as 7.

It can be seen that by incorporating a crystalline polyester thickener having the characteristics of resins C-H in Table 1 in a moulding composition, the resultant moulding is provided with excellent surface characteristics, especially a high degree of smoothness, a high gloss and negligible visibility of any pattern due to the presence of the glass fibers.

Each of these crystalline resins C–H has a glycol component derived from at least two symmetrical glycols.

We claim:

1. A moulding composition comprising:
   fibrous reinforcement;
   an additive selected from low profile and low shrink additives;
   an ethylenically unsaturated, essentially amorphous polymer selected from the group consisting of unsaturated polyester, vinyl ester and urethane acrylate polymers;
   a monomer copolymerisable therewith, and
   a thickener being a crystalline unsaturated polyester having a glycol component derived from at least two symmetrical glycols and having a molecular weight per double bond of no more than about 210, the crystalline unsaturated polyester being present in the composition in an amount of from about 10 to about 50% by weight of the total weight of the ethylenically unsaturated amorphous polymer, the monomer copolymerisable therewith and the crystalline unsaturated polyester, whereby the effectiveness of the said additive is retained.

2. A moulding composition according to claim 1, wherein the crystalline unsaturated polyester has a melting point of from about 50° to about 115° C. inclusive.

3. A moulding composition according to claim 1, wherein the crystalline unsaturated polyester has a melt viscosity of from about 1 to about 40 p inclusive at 125° C.

4. A moulding composition according to claim 1, wherein the glycol component is derived from a mixture of two glycols each selected from 1,6-hexanediol, ethylene glycol, neopentyl glycol and 1,4-cyclohexanedimethanol.

5. A moulding composition according to claim 4, wherein the glycol component is derived from a mixture of 1,6-hexanediol and a glycol selected from ethylene glycol and 1,4-cyclohexanedimethanol.

6. A moulding composition according to claim 4, wherein glycol component is derived from a mixture of ethylene glycol and 1,4-cyclohexanedimethanol.

7. A moulding composition according to claim 1, which is a sheet moulding compound.

8. A moulding composition according to claim 1, which is a thick moulding compound.

9. A moulding composition according to claim 1, wherein the said additive is selected from polyethylene, acrylic copolymers, polystyrene (optionally modified by the presence of units capable of providing elastomeric properties), saturated polyesters, polycaprolactones and polyvinyl acetate.

10. In a moulding composition comprising fibrous reinforcement, an additive selected from low profile and low shrink additives, an ethylenically unsaturated, essentially amorphous polymer selected from unsaturated polyester, vinyl ester and urethane acrylate polymers, a monomer copolymerizable therewith and, as thickener, a crystalline unsaturated polyester, the improvement comprising providing therein, as the said crystalline unsaturated polyester, a said polyester having (i) a glycol component derived from at least two symmetrical glycols, (ii) a molecular weight per double bond of no more than about 210, and (iii) a melting point of from about 50° to 115° C. inclusive, whereby the effectiveness of the said additive is retained.

* * * * *